US011187289B2

(12) United States Patent
Hassani et al.

(10) Patent No.: US 11,187,289 B2
(45) Date of Patent: Nov. 30, 2021

(54) BELLOWS, AND AT LEAST ONE DISC BRAKE HAVING A BELLOWS

(71) Applicant: KNORR-BREMSE Systeme fuer Nutzfahrzeuge GmbH, Munich (DE)

(72) Inventors: Akbar Hassani, Dachau (DE); Ralf Weber, Munich (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 149 days.

(21) Appl. No.: 16/556,934

(22) Filed: Aug. 30, 2019

(65) Prior Publication Data

US 2019/0383338 A1 Dec. 19, 2019

Related U.S. Application Data

(63) Continuation of application No. PCT/EP2018/055092, filed on Mar. 1, 2018.

(30) Foreign Application Priority Data

Mar. 3, 2017 (DE) ...................... 10 2017 104 442.6

(51) Int. Cl.
*F16D 65/00* (2006.01)
*F16D 55/225* (2006.01)
*F16J 3/04* (2006.01)

(52) U.S. Cl.
CPC ....... *F16D 65/0087* (2013.01); *F16D 55/225* (2013.01); *F16J 3/04* (2013.01)

(58) Field of Classification Search
CPC .............. F16D 65/0093; F16D 55/225; F16D 65/0087; F16J 3/04; F16J 3/042; F16J 3/048
See application file for complete search history.

(56) References Cited

U.S. PATENT DOCUMENTS

| 4,613,018 A | 9/1986 | Weiler et al. |
| 2001/0047913 A1 | 12/2001 | Conti et al. |
| 2006/0175155 A1 | 8/2006 | Gasslbauer et al. |
| 2009/0000881 A1 | 1/2009 | Gasslbauer |

(Continued)

FOREIGN PATENT DOCUMENTS

| DE | 33 41 480 A1 | 6/1985 |
| DE | 42 12 389 A1 | 10/1993 |

(Continued)

OTHER PUBLICATIONS

Translation of document EP 2354585 obtained via website: https://worldwide.espacenet.com on Apr. 7, 2021.*

(Continued)

*Primary Examiner* — Pamela Rodriguez
(74) *Attorney, Agent, or Firm* — Crowell & Moring LLP

(57) ABSTRACT

A rotationally symmetrical bellows has a first end ring and a second end ring with a smaller diameter, and multiple folds, which in a relaxed position each have two flanks running in opposite directions with respect to one another while forming a bend. The flanks extend approximately parallel to an axis of rotation of the bellows. The rotationally symmetrical bellows is designed such that in a relaxed position of the bellows, the second end ring is arranged at an axial distance to the first end ring.

9 Claims, 2 Drawing Sheets

(56) References Cited

U.S. PATENT DOCUMENTS

| | | | |
|---|---|---|---|
| 2009/0236189 A1* | 9/2009 | Macke | F16J 15/52 188/73.43 |
| 2016/0186827 A1 | 6/2016 | Jungmann et al. | |
| 2018/0259021 A1* | 9/2018 | Weber | F16D 65/183 |
| 2019/0063529 A1 | 2/2019 | Eguchi | |
| 2020/0347898 A1* | 11/2020 | Redemann | F16D 55/225 |

FOREIGN PATENT DOCUMENTS

| DE | 94 10 455 U1 | 10/1995 |
|---|---|---|
| DE | 103 31 929 B3 | 9/2004 |
| DE | 10 2009 007 698 A1 | 8/2009 |
| DE | 2199639 A2 * | 6/2010 |
| DE | 10 2008 063 890 A1 | 7/2010 |
| DE | 2354585 A1 * | 8/2011 |
| DE | 10 2013 006 859 A1 | 10/2014 |
| DE | 10 2015 005 180 A1 | 10/2015 |
| DE | 10 2015 114 351 A1 | 3/2017 |
| DE | WO-2017/215990 A1 * | 12/2017 |
| EP | 1 972 821 A1 | 9/2008 |
| EP | 2 431 627 A2 | 3/2012 |
| ER | 0 565 997 B1 | 10/1995 |
| WO | WO 2007/012413 A1 | 2/2007 |
| WO | WO 2010/049133 A1 | 5/2010 |
| WO | WO 2016/116096 A1 | 7/2016 |
| WO | WO 2017/138450 A1 | 8/2017 |

OTHER PUBLICATIONS

International Search Report (PCT/ISA/210) issued in PCT Application No. PCT/EP2018/05S092 dated May 29, 2018 with English translation (five (5) pages).

German-language Written Opinion (PCT/ISA/237) issued in PCT Application No. PCT/EP2018/055092 dated May 29, 2018 (six (6) pages).

German-language Office Action issued in counterpart German Application No. 10 2017 104 442.6 dated Nov. 13, 2017 (10 pages).

Chinese-language Office Action issued in Chinese Application No. 201880015521.0 dated May 29, 2020 with English translation (11 pages).

International Preliminary Report on Patentability (PCT/IB/326 & PCT/IB/373) issued in PCT Application No. PCT/EP2018/055092 dated Sep. 12, 2019, including English translation of document C2 (German-language Written Opinion (PCT/ISA/237) previously filed on Aug. 30, 2019) (nine (9) pages).

Chinese-language Office Action issued in Chinese Application No. 201880015521.0 dated Sep. 3, 2021 with English translation (nine (9) pages).

* cited by examiner

BELLOWS, AND AT LEAST ONE DISC BRAKE HAVING A BELLOWS

CROSS REFERENCE TO RELATED APPLICATIONS

This application is a continuation of PCT International Application No. PCT/EP2018/055092, filed Mar. 1, 2018, which claims priority under 35 U.S.C. § 119 from German Patent Application No. 10 2017 104 442.6, filed Mar. 3, 2017, the entire disclosures of which are herein expressly incorporated by reference.

BACKGROUND AND SUMMARY OF THE INVENTION

The invention relates to bellows and to a disc brake which has at least one bellows.

The use of bellows of this type is well known, in particular in disc brakes for a commercial vehicle. In this regard, reference is made by way of example to DE 103 31 929 B3.

In order to protect functionally relevant components which are positioned in the brake caliper, such as a brake application or adjusting device, against corrosion as a result of weather influences, the brake caliper is sealed with respect to the surrounding area in the passage region of actuating spindles. To this end (in accordance with the cited literature) each actuating spindle is assigned a bellows as a sealing element, which bellows is fastened on one side to the actuating spindle or a pressure piece which is operatively connected to the latter and bears against a brake application-side brake pad, and on the other side to a closure plate which closes the interior space of the brake caliper.

Here, the bellows is pressed with its dimensionally stable end ring of greater diameter into the closure plate and is held in a frictionally locking manner. If the closure plate is dispensed with, the bellows can be fastened directly to the brake caliper, and can preferably likewise be pressed-in.

In a manner which tracks the wear of the brake pads and the brake disc, the actuating spindles are moved toward the brake disc by way of the abovementioned adjusting device, it being necessary for the bellows to ensure its sealing function over the entire adjusting travel of the actuating spindle.

On account of the available degree of wear, the actuating spindle performs a correspondingly great movement travel in the case of the wear-induced adjustment, as does the associated bellows; the latter is intended to compensate for a stroke>50 mm.

In order to make a stroke of this size possible, the bellows has a plurality of folds, the number of which is limited, however, by way of the available installation space. In order to achieve the desired stroke, the height of the flanks is dimensioned correspondingly.

Problems result, however, from the fact that at least part of the flanks can be deformed or bent during the extension of the second end ring of smaller diameter which is connected to the actuating spindle or to the pressure piece. The result is that the height of the flanks becomes so great in the extended position, as it were, that they become unstable and deviate from the circular shape. Here, the stretched flanks buckle at a plurality of locations and form a polygonal shape, the points of which make contact with adjacent components, which leads to abrasion and wear.

This is particularly pronounced, above all, when the installation space is particularly small.

Since the bellows is moved in the axial direction by up to 4 mm in the case of each braking operation, frictional contact with the adjacent surfaces occurs during the service life of the disc brake, that is to say up to the wear limit of the relevant components, with the consequence that leaks are formed, which can ultimately lead to a failure of the brake.

Moreover, replacement of the bellows in a manner which deviates from standardized maintenance work is difficult, since the bellows are accessible only with difficulty in the case of an installed disc brake.

The invention is based on the object of developing a bellows of the generic type in such a way that its functional reliability and service life are improved.

According to the invention, a rotationally symmetrical bellows has a first end ring and a second end ring with a smaller diameter, and a plurality of folds which, in the relaxed position, have in each case two flanks which run in opposite directions with respect to one another while forming a bend and extend approximately parallel to a rotational axis of the bellows. In the relaxed position of the bellows, the second end ring is arranged at an axial spacing from the first end ring. This structural embodiment of the bellows ensures that, in particular when it is stretched, the predefined circular contour of the individual folds is maintained. The risk of a lateral deflection of the folds, that is to say of the bends, with the formation of a contour which differs from the circular shape (as described with respect to the prior art), is therefore prevented effectively.

As a result, considerable advantages arise, above all, in the case of the use of a bellows of this type in a sliding caliper disc brake, primarily an increase in the service life, since folds can then no longer come into contact with adjacent components.

A premature replacement of the bellows is therefore no longer required, which results overall in an optimization with regard to the operating costs; it is to be taken into consideration that commercial vehicles are equipped in each case with a multiplicity of disc brakes.

In accordance with one advantageous development of the bellows according to the invention, the axial spacing between the free upper edge of the second end ring and that edge of the first end ring which faces it is at least 8 mm, preferably from 8 to 18 mm, in the relaxed position of the bellows, that is to say before assembly.

The relative displacement of the first end ring with respect to the second end ring, which relative displacement is kink-free as it were, results even in the case of an installation of the bellows into the disc brake, in the case of which the second end ring of smaller diameter is displaced toward the first end ring as far as approximately into a common overlap region.

Here, at least part of the folds or their flanks are deformed, with maintenance of a circular contour.

For example, in the case of a spacing of the two end rings from one another of 15 mm in the relaxed position of the bellows and pushing of the second end ring during assembly into a disc brake with the abovementioned deformation of the flanks or folds, merely an extension of 35 mm with respect to the relaxed position is required, in order to stretch the bellows by 50 mm as is customary, as far as the wear limit of the relevant wear and tear parts, that is to say, in particular, of the brake pads.

A further advantage results from the fact that merely small stretching forces are active during the stretching of the bellows owing to the design, which stretching forces critically determine the friction forces, by way of which the bellows is held on the closure plate and on the pressure piece or the actuating spindle.

The maximum force to be overcome during stretching of the bellows is dependent on the rigidity of the folds, but, in particular, on the height of the flanks of the respective folds.

It is therefore provided in accordance with one further aspect of the invention to dimension the height of the flank which is assigned to the first end ring in such a way that the adjoining bend terminates approximately with that end side of the first end ring which faces away from the second end ring. In this way, a minimization of the pull-out force is achieved in the case of the pull-out force during the stretching of the bellows.

In a manner which is known per se, the bellows consists of a flexible material, in particular an elastomer or a comparatively deformable material, at least the first end ring preferably being dimensionally stable, for example by way of embedding of a metal ring or by way of overmolding using the two component method of a plastic which is more rigid than the folds.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
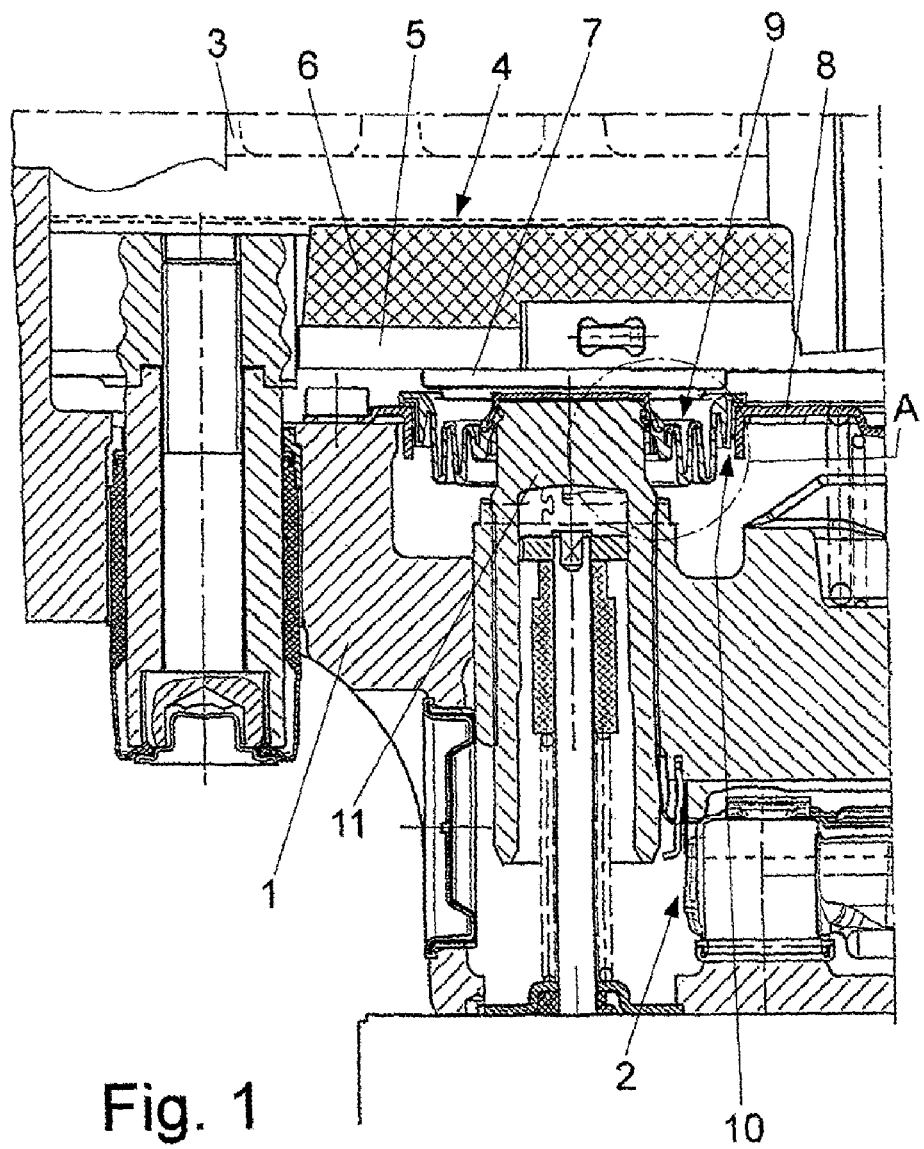
FIG. 1 shows a part of a disc brake in accordance with the prior art, in a sectioned plan view.

FIG. 1 shows one half of a disc brake which can be actuated pneumatically or by electric motor and has a brake caliper 1 which is configured as a sliding caliper and reaches over a brake disc 3.

Brake pads 4 are arranged on both sides of the brake disc 3, of which brake pads 4 only one is shown here which can be pressed against the brake disc 3 in the functional case.

The brake pad 4 consists of a pad carrier plate 5 and a friction lining 6 which is fastened on the side which faces the brake disc 3.

In the case of a braking operation, the brake pad 4 is pressed against the brake disc 3 by way of a brake application device 2 which is arranged in the brake caliper 1 and is actuated by a brake lever, an actuating spindle 11 and a pressure piece 7 which bears against the brake pad 4.

In order to compensate for a wear-induced change in the air gap, that is to say the spacing between the friction lining 6 and the brake disc 3, the actuating spindle 11, which is configured as a threaded spindle, is mounted rotatably on the brake caliper 1 and can be moved via an adjusting device (not shown).

In order to protect against weather influences on the functional parts which are arranged in the interior of the brake caliper 1, the brake caliper 1 is closed on its side which faces the brake disc 3 by way of a closure plate 8 which is interrupted in the outlet region of the actuating spindle 11 and forms an outlet opening 10 there.

In order to seal the outlet opening 10, a bellows 9 which is connected to the closure plate 8 is provided, which bellows 9 is connected to the closure plate 8 such that it cannot rotate, and is likewise connected to the pressure piece 7.

Figure 2:
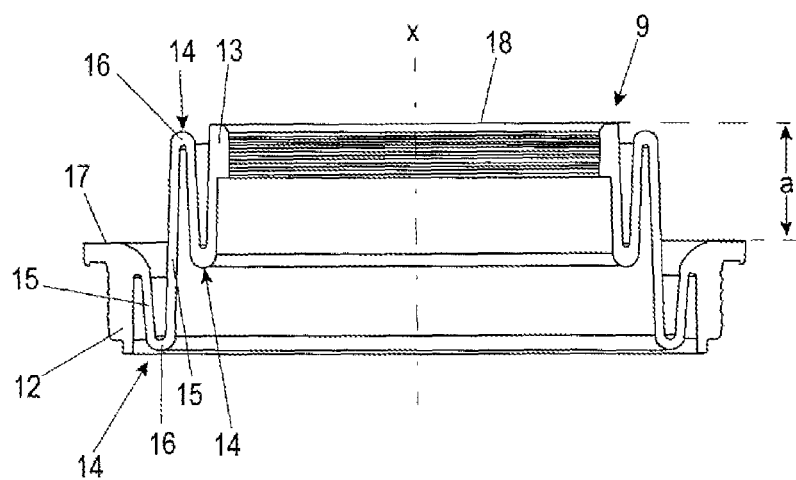
FIG. 2 shows a bellows according to an embodiment of the invention in a relaxed position.

As shown very clearly, in particular by FIG. 2 which shows the bellows in a relaxed position, the rotationally symmetrical bellows 9 has a dimensionally stable first end ring 12 and a second end ring 13 of smaller diameter, which end rings 12, 13 are connected to one another by way of a plurality of (in the example, three) folds 14.

With the formation of a bend 16, each fold 14 has two flanks 15 which run in opposite directions to one another and extend approximately parallel to a rotational axis X of the bellows 9.

In the relaxed position of the bellows 9, in accordance with the invention, the second end ring 13 is arranged at an axial spacing "a" from the first end ring 12, the spacing "a" being at least 8 mm, preferably from 8 to 18 mm, and particularly preferably from 10 to 15 mm. Here, the spacing "a" is defined as the axial measure between an upper edge 18 of the second end ring 13 of smaller diameter and the facing upper edge 17 of the first end ring 12.

Here, the height of the flanks 15 which adjoin the first end ring 12 is approximately from 6 to 8 mm.

Figure 3:
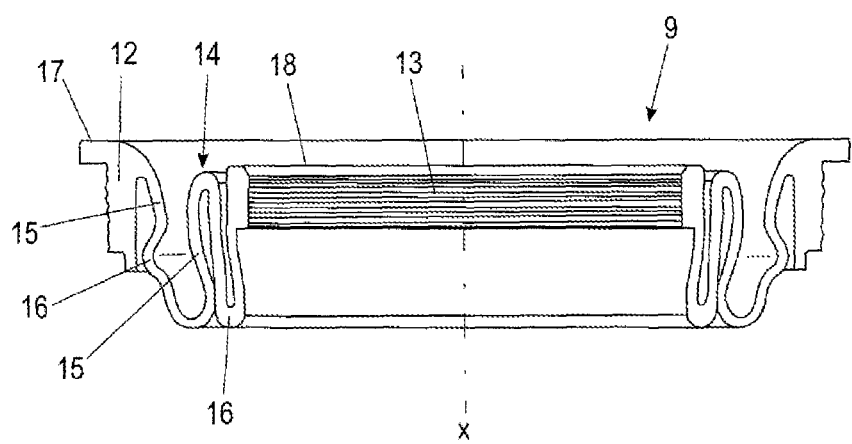
FIG. 3 shows the bellows as a detail after assembly into a disc brake having unworn brake pads.

FIG. 3 depicts a position of the bellows 9, as is produced after an installation into a brake disc in accordance with FIG. 1, to be precise in the case of unworn brake pads.

Here, the second end ring 13 is displaced toward the first end ring 12 to such an extent that the two end rings 12, 13 lie approximately in a circumferential overlap region, whereas the folds 14 or their flanks 15 and bends 16 are deformed, at least partially, but in such a way that circular contours result in every case.

These circular contours are maintained even if the second end ring 13 is pushed out of the overlap region with the first end ring 12 on account of the axial adjustment of the actuating spindle 11, for example as far as an end position, in which the spacing a is 35 mm, with consideration of the spacing a of 15 mm in the relaxed position of the bellows 9, in accordance with FIG. 2. This results overall in a stroke of 50 mm.

LIST OF DESIGNATIONS

1 Brake caliper
2 Brake application device
3 Brake disc
4 Brake pad
5 Pad carrier plate
6 Friction lining
7 Pressure piece
8 Closure plate
9 Bellows (boot or bellows seal)
10 Outlet opening
11 Actuating spindle
12 End ring
13 End ring
14 Fold
15 Flank
16 Bend
17 Upper edge
18 Upper edge The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotationally symmetrical bellows, comprising:
a first end ring;
a second end ring having a smaller diameter than that of the first end ring;
a plurality of folds which, in a relaxed position, each have two flanks extending in opposite directions with respect to one another while forming a bend, the flanks extending approximately parallel to a rotational axis of the bellows,
wherein
in the relaxed position of the bellows, the second end ring is arranged at an axial spacing from the first end ring, and
a flank of the plurality of flanks adjacent to the first end ring is dimensioned such that an adjoining one of the bends terminates at an axial height corresponding to an axial height of an end side of the first end ring which faces away from the second end ring.

2. The rotationally symmetrical bellows as claimed in claim 1, wherein
the spacing is at least 8 mm.

3. The rotationally symmetrical bellows as claimed in claim 1, wherein
the spacing is from 8 to 18 mm.

4. The rotationally symmetrical bellows as claimed in claim 1, wherein
the spacing is from 10 to 15 mm.

5. The rotationally symmetrical bellows as claimed in claim 1, wherein
three folds are provided.

6. The rotationally symmetrical bellows as claimed in claim 1, wherein
the spacing is defined as a measure between that free end side of the second end ring which forms an upper edge and the facing upper edge of the first end ring.

7. A disc brake for a commercial vehicle for use with a brake disc, comprising:
a brake caliper that extends over the brake disc when installed;
a brake application device by which a brake pad is pressable against the brake disc via at least one actuating spindle, the actuating spindle having a pressure piece that presses the brake pad;
a deformable bellows encloses the actuating spindle between the pressure piece and the brake caliper, wherein
the bellows is held via a first end ring in a frictionally locking manner in an outlet opening of the brake caliper or a closure plate having the outlet opening, and by way of a second end ring in a frictionally locking manner on the actuating spindle or the pressure piece, and
wherein
the second end ring has a smaller diameter than the first end ring of the bellows,
the bellows has a plurality of folds which, in a relaxed position, each have two flanks extending in opposite directions with respect to one another while forming a bend, the flanks extending approximately parallel to a rotational axis of the bellows,
in the relaxed position, the second end ring is arranged at an axial spacing from the first end ring, and
a flank which is assigned to the first end ring is dimensioned such that an adjoining one of the bends terminates at an axial height corresponding to an axial height of an end side of the first end ring which faces away from the second end ring.

8. The disc brake as claimed in claim 7, wherein
in the case of non-worn brake pads, the second end ring of the bellows is arranged approximately in a circumferential overlap region with the first end ring, with deformation of at least one part of the flanks and/or the bends.

9. The disc brake as claimed in claim 8, wherein
the flanks and the bends have a circular contour in every position of the bellows during operation of the disc brake.

* * * * *